United States Patent [19]

Islam

[11] Patent Number: 5,020,050
[45] Date of Patent: May 28, 1991

[54] CASCADABLE OPTICAL COMBINATORIAL LOGIC GATES

[75] Inventor: Mohammed N. Islam, Hazlet, N.J.

[73] Assignee: AT&T Bell Laboratories, Murray Hill, N.J.

[21] Appl. No.: 420,972

[22] Filed: Oct. 13, 1989

[51] Int. Cl.$^5$ .............................................. H04J 3/00
[52] U.S. Cl. ...................................... 370/4; 455/608; 455/610
[58] Field of Search .......................... 370/4, 110.4, 3; 375/121; 364/822; 455/608, 610, 611

[56] References Cited

U.S. PATENT DOCUMENTS

| | | | |
|---|---|---|---|
| 4,868,809 | 9/1989 | Kahn | 370/4 |
| 4,881,788 | 11/1989 | Doran | 455/611 |
| 4,900,115 | 2/1990 | Heuring et al. | 455/610 |
| 4,922,479 | 5/1990 | Su | 455/600 |
| 4,932,739 | 6/1990 | Islam | 350/96.15 |

OTHER PUBLICATIONS

C. R. Menyuk, J. Opt. Soc. Am. B., vol. 5, No. 2, Feb. 1988, "Stability of Solitons in Birefringent . . . ", pp. 392–402.
M. N. Islam et al., Optics Lett., vol. 13, No. 6, Jun. 1988, "Modulation-Instability-Based Fiber Interferometer . . . ", pp. 518–520.
A. Hasegawa et al., Appl. Phys. Lett., vol. 23, No. 3, Aug. 1, 1973, "Transmission of Stationary Nonlinear . . . ", pp. 142–144.
N. J. Doran et al., J. Opt. Soc. Am. B, vol. 4, No. 11, Nov. 1987, "Soliton Processing Element for All-Optical . . . ", pp. 1843–1846.
C. R. Menyuk, Optics Lett., vol. 12, No. 8, Aug. 1987, "Stability of Solitons in Birefringent . . . ", pp. 614–616.

*Primary Examiner*—Reinhard J. Eisenzopf
*Assistant Examiner*—Kinfe-Michael Negash
*Attorney, Agent, or Firm*—Gregory C. Ranieri

[57] ABSTRACT

Combinatorial logic devices are presented in which data signals interact with an enable signal in the device to move the enable signal outside its prescribed time slot when one or both of the data signals are present. Data signals are discarded within the device to avoid propagation through subsequent logic device stages. Such logic devices are particularly well suited to all-optical realizations in which soliton pulse signals are used. These devices exhibit high gain, cascadability and potentially large fanout capability.

11 Claims, 3 Drawing Sheets

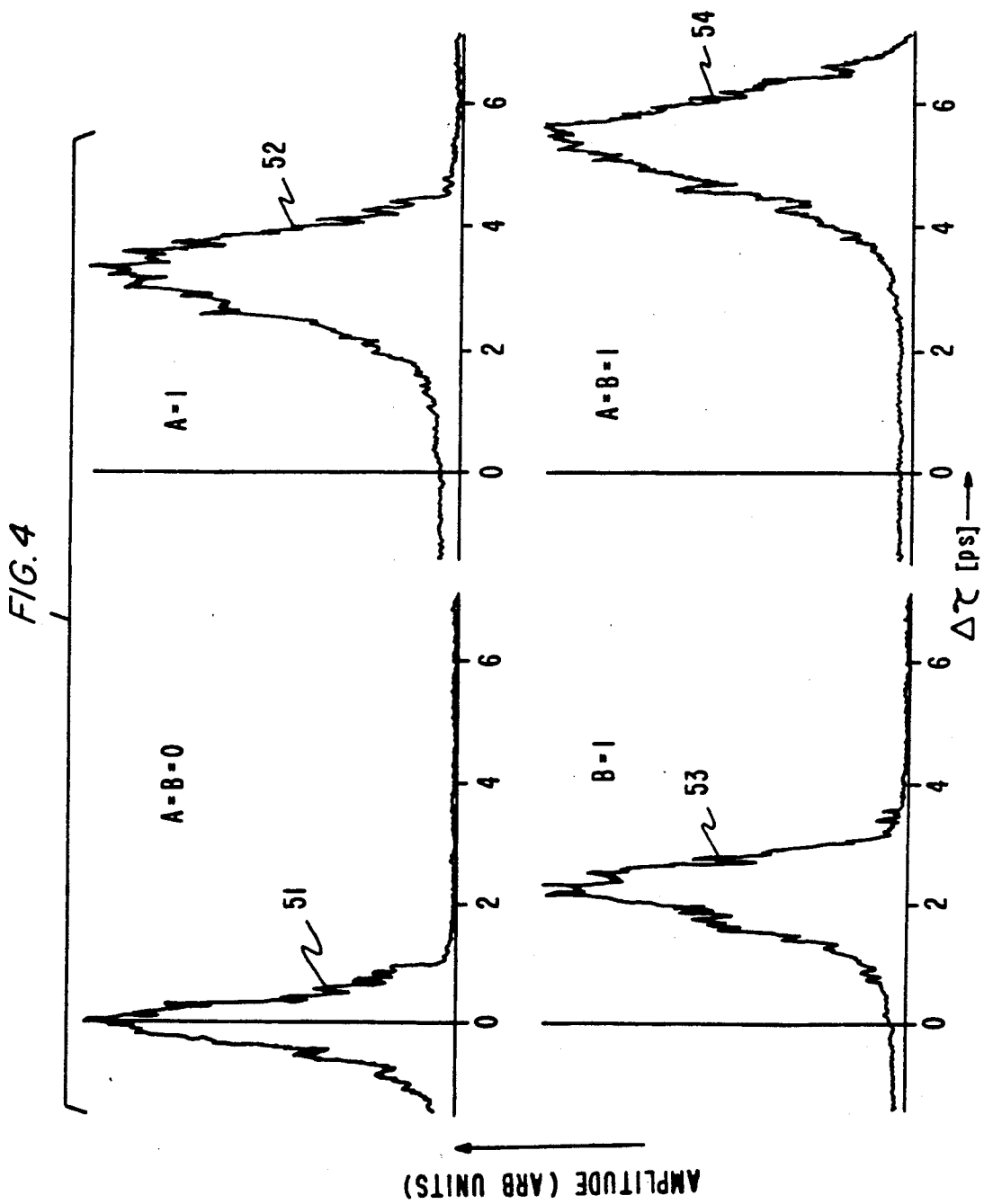

CASCADABLE OPTICAL COMBINATORIAL LOGIC GATES

CROSS-REFERENCE TO RELATED APPLICATION

This application is related to U.S. patent application Ser. No. 412,242 filed on Sept. 25, 1989 now U.S. Pat. No. 4,932,739 which application is commonly assigned.

TECHNICAL FIELD

This invention relates to combinatorial logic gate devices and, more particularly, to optical devices realizing combinatorial logic functions.

BACKGROUND OF THE INVENTION

Optical computing is recognized as an emerging technology. Its continued maturation depends heavily on the availability of a wide range of logic devices and, more specifically, optical devices performing combinatorial logic functions. While the range of combinatorial logic functions such as AND, OR and NOT is important in the first instance, it is almost equally important to provide cascadability, logic level restoration, phase insensitivity, speed and input/output isolation. An additional consideration, though not presently decided upon, may be a need for an all-optical device.

A symmetric self electrooptic effect device commonly known as the S-SEED is the only known device to achieve many of the attributes shown above while affording a means for performing combinatorial logic functions. See, for example, U.S. patent application Ser. No. 341,524 and an article by A. Lentine et al. appearing at *Appl. Phys. Lett.*, Vol. 52, No. 7, pp. 1419–21 (1988). The S-SEED is an electrooptic device owing to the fact that it is electrically biased with a pair of semiconductor quantum well diodes interconnected to achieve a proper degree of electrical feedback so that impinging optical signals are correctly processed. As such, the S-SEED does not meet the potential criterion for an all-optical device. Moreover, while the S-SEED does provide gain, it does so in a time-sequential manner. In this mode of operation, optical data signals impinge on the device during a first time instant for combinatorial logic processing and a resultant signal, which represents the result of performing the logic function on the optical data signals, is read out of the S-SEED by a higher power optical clock signal during a later time instant. Accordingly, the S-SEED lacks the capability for real-time operation when providing time-sequential gain for cascadability.

SUMMARY OF THE INVENTION

Cascadability, signal level restoration, speed, phase insensitivity and real time operation are achieved in an all-optical combinatorial logic device. Extremely high contrast between on and off states is afforded because the device employs a novel architecture in which the output state of the logic device is determined by the presence or absence of a resultant signal during a prescribed time slot.

Combinatorial logic devices realized in accordance with the principles of this invention accept one or more input data signals and an enable signal during a particular time slot. The time slot, as is discussed below, is generally related to a characteristic of the data signal and enable signal pulse width such as the full width half maximum (FWHM). In general, when one or more of the data signals occurs during the same time slot as the enable signal, the combinatorial logic device through interaction between the data signals and the enable signal causes the enable signal to be moved to a neighboring time slot which may or may not be directly adjacent to the original time slot. That is, the enable signal is effectively removed from the time slot in which it originally occurred. The logical output state of the combinatorial logic device is then determined by observing the presence or absence of the enable signal during the original time slot at the device output.

Several embodiments of the present invention are shown for realizing all-optical NOR logic devices.

BRIEF DESCRIPTION OF THE DRAWING

A more complete understanding of the invention may be obtained by reading the following description of specific illustrative embodiments of the invention in conjunction with the appended drawing in which:

FIG. 4 shows graphs of amplitude versus time delay for an output signal from the device implementation shown in FIG. 3.

DETAILED DESCRIPTION

Combinatorial logic devices realized in accordance with the principles of this invention are cascadable with a controllably large amount of fanout and provide gain. These devices accept one or more input data signals and an enable signal during a particular time slot. The time slot, as is discussed below, is generally related to a characteristic of the data signal and enable signal pulse width such as the full width half maximum (FWHM). In general, when one or more of the data signals occurs during the same time slot as the enable signal, the combinatorial logic device through interaction between the data signals and the enable signal causes the enable signal to be moved to a neighboring time slot which may or may not be directly adjacent to the original time slot. That is, the enable signal is effectively removed from the time slot in which it originally occurred. The logical output state of the combinatorial logic device is then determined by observing the presence or absence of the enable signal during the original time slot.

Gain is afforded in this device structure by employing enable signals which are much larger than the corresponding data signals. Gain results from having a relatively low level signal control a much larger signal. As a result of the device gain, devices are cascadable without a need for signal amplification between cascaded devices. Moreover, because each device generates a high level output signal corresponding to the level of the enable signal and further because input data signals are at a relatively low level, it is possible to divide the device output signal into a plurality of signals which are supplied to subsequent combinatorial logic devices. Division of an output signal in this manner is commonly called fanout.

Figure 1:
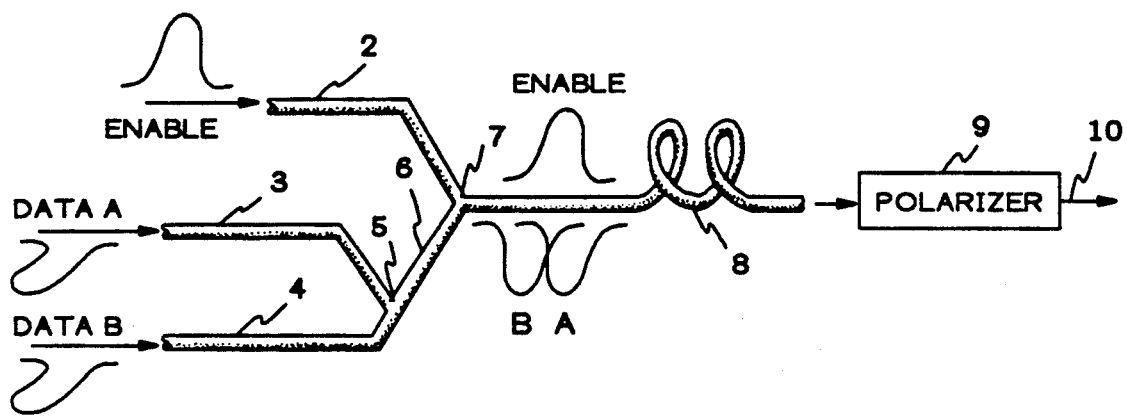
FIGS. 1 and 2 show simplified schematic diagrams of a combinatorial logic device in accordance with the principles of the invention.
Figure 2:
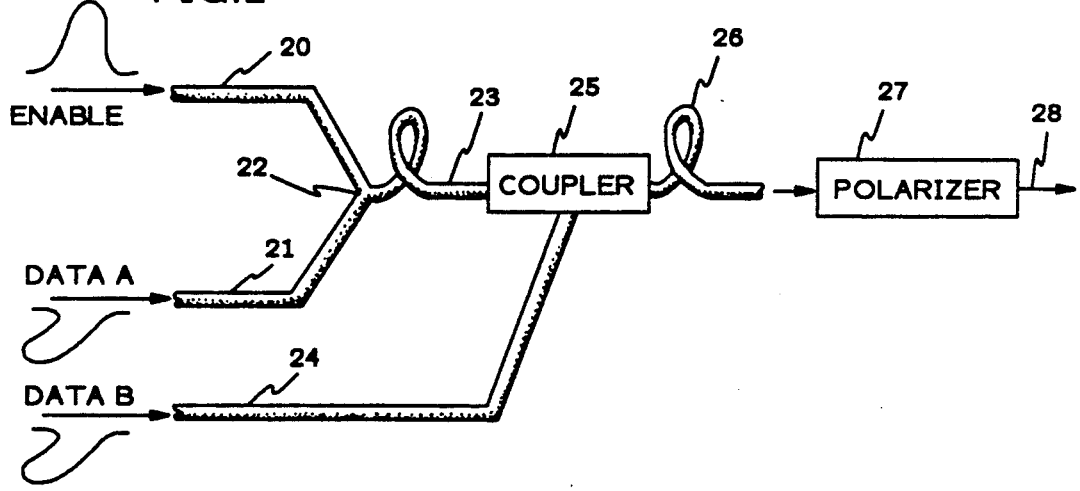
Figure 3:
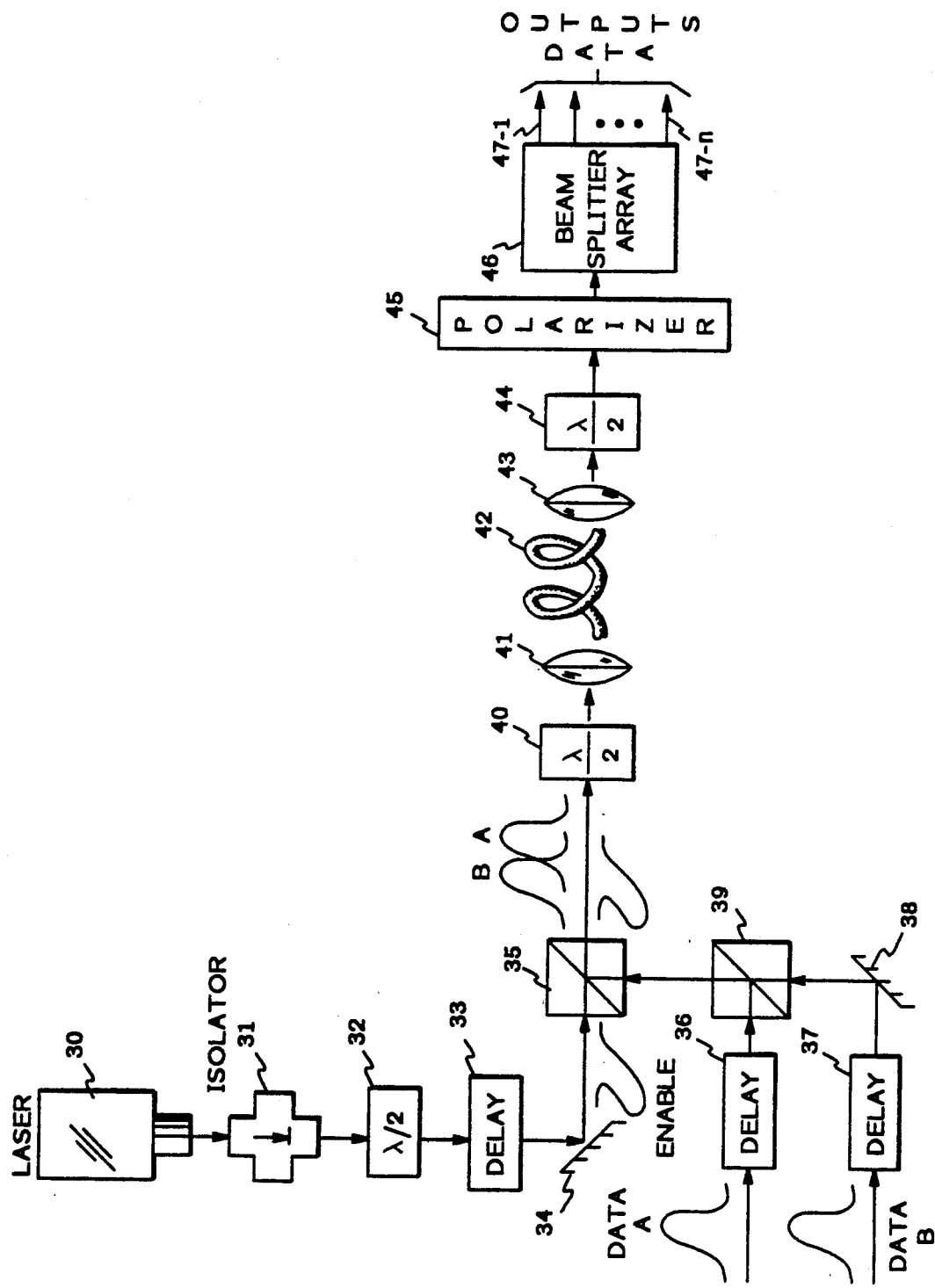
FIG. 3 shows a detailed schematic diagram of an implementation for the device shown in FIG. 1.

Examples of combinatorial logic devices operating an optical signals in accordance with the principles of the invention set forth above are shown in simplified form in FIGS. 1 and 2 and in a more detailed form in FIG. 3. The optical signals employed by these devices comprise pulses commonly known as solitons. At the present time, soliton-based systems appear to be the most desirable candidate system for incorporating combinatorial logic devices of the type presented herein. In order to gain a better understanding of the devices shown in the figures, a brief overview of solitons is presented below.

Fourier transform limited optical pulses propagating through an optical fiber experience pulse spreading due to a variation of group velocity called group velocity dispersion. Group velocity dispersion results from a linear dependence of the index of refraction on spectral frequency. That is, different spectral portions of an optical pulse travel at a different group velocity which, in turns, leads to a temporal broadening of the propagating optical pulse. Additionally, the fiber has a third-order nonlinear effect (self-phase modulation) in which its refractive index, n, depends on the light intensity, I, through the formula, $n = n_0 + n_2 I$, where $n_0$ is the linear refractive index and $n_2$ is the nonlinear refractive index. Balancing the negative group velocity dispersion with this nonlinear, intensity dependent effect gives rise to the formation of a soliton in the fiber. An input optical field of the form given by $u = (1+a) \text{sech}(t)$ contains a fundamental soliton when the amplitude, a, lies in the range of $-\frac{1}{2} < a < \frac{1}{2}$. Furthermore, the peak power, $P_1$, of an optical pulse with pulse duration, $\tau$, required to generate a single soliton in a single-mode fiber with effective-mode field area $A_{eff}$ is given by $$P_1 = \frac{\lambda A_{eff}}{4 n_2 Z_0}, \quad (1)$$

$$Z_0 = \frac{0.322 \pi^2 c \tau^2}{\lambda^2 |D|}, \quad (2)$$

where $P_1$ is the fundamental soliton power, $Z_0$ is the soliton period, and D is the dispersion in psec/nm·km. For a more detailed explanation of solitons, see Hasegawa et al., *Appl. Phys. Lett.*, Vol. 23, No. 3, pp. 142-44, (1973).

While solitons are nonlinear optical pulses that propagate in the anomalous group velocity dispersion region (D > 0) of the fiber without dispersing, solitons having different polarization states can still travel at a different group velocity ("walk-off") due to the birefringence of the fiber. Birefringence is that property of a material which cause two different polarization states to propagate at different velocities because the material has an ordinary and extraordinary index of refraction, i.e., a different refractive index for each polarization state.

Recently, it has been shown in principle that orthogonally polarized solitons of substantially equivalent amplitudes can trap one another and travel as a unit because of an intensity dependent effect that compensates for the birefringence. See C. R. Menyuk, *Optics Letter*, Vol. 12, No. 8 pp. 614-6 (1987) and C. R. Menyuk, *J. Opt. Soc. Am. B*, Vol. 5, No. 2 pp. 392-402 (1988). Specifically, two equivalent level soliton pulses are caused to shift their center spectral frequency in opposite directions such that, through group velocity dispersion, the soliton pulse traveling along the fast axis slows down while the soliton pulse traveling along the slow axis speeds up. As the group velocity of each soliton pulse reaches equilibrium, the soliton pulses travel as an unit. Additionally, the trapped soliton pair appears at the output of the fiber at a time, $t + \Delta t$, where t is the time at which a single soliton would have appeared at the output.

When the orthogonal soliton pulses are of vastly different amplitudes, the trapping effect is insignificant and the time delay or "dragging" effect is accentuated as viewed from the larger soliton pulse. The soliton dragging effect is affected by the overlap in time of the orthogonal pulses and their relative amplitudes. It has been determined in general that, when the smaller pulse overlaps the larger pulse within approximately one soliton pulse width of the center of the larger pulse, soliton dragging occurs. The overlap may be decreased, that is, the pulses may be separated farther, for pulses of somewhat more comparable amplitude. For pulses having significantly different amplitudes, it is necessary to follow the rule of thumb given previously.

As shown in FIG. 1, an all-optical combinatorial logic device realized in accordance with the principles of this invention performs a NOR function. The device comprises input fibers 2, 3 and 4, couplers 5 and 7, birefringent optical fiber 8, and polarizer 9. Birefringent optical fibers having a birefringence induced by strain, material composition, geometry, or the like, on the order of $10^{-5}$ are suitable for realizing the devices shown in the figures. Birefringence is measured as the refractive index difference between the ordinary and extraordinary axes or polarization directions.

It is desirable, although not necessary, to supply the enable signal in a polarization compatible with the fast axis of birefringent optical fiber 8 whereas the data signals are generally supplied in the orthogonal polarization corresponding to the slow axis of the fiber 8.

A high level enable signal is supplied to input fiber 2. Relatively low level data signals A and B, polarized orthogonally with respect to the enable signal, are supplied to input fibers 3 and 4, respectively. Proper operation of the logic device depends on a significant overlap in time of the data signals with the enable signal while the data signals are positioned to have minimal overlap in time. Additionally, the signals are presumed to have sufficient amplitude and proper amplitude to form as soliton pulses within the device. By convention, the presence of a soliton pulse is taken as a logical "1" whereas the absence of a soliton pulse is taken as a logical "0".

Coupler 5 merges data signals A and B onto fiber 6. Coupler 7 merges the combined data signals with the enable signal onto birefringent fiber 8. Optical fiber 8 is properly trimmed so that, when the enable signal appears in a prescribed time slot with no other data signals appearing, the output of the device as seen at output 10 is a logical "1" in the prescribed time slot. When either data signal A or B or both signals are added in the same prescribed time slot with proper overlap, soliton dragging between the signals causes the enable signal to be slowed and to be moved outside the prescribed time slot.

The number of time slots through which the enable pulse is shifted should be at least one and, preferably, two slots each of which corresponds to a signal pulse width. It should be noted that the generally accepted measure of pulse width is full width half maximum (FWHM). This shift may also be increased by lengthening the optical fiber 8. Since soliton systems are designed with a large number ($\approx 10$) of substantially vacant time slots around each soliton pulse, interference between dragged pulses and subsequent pulses is substantially eliminated.

To avoid clock skew problems, it has been determined that fiber lengths should be accurately trimmed. For soliton pulses with a pulse width $\tau$ equal to 300 fs, fiber lengths are preferably corrected to an accuracy of $\mu(c/n)$ or approximately 60 $\mu$m.

Polarizer 9 is employed to extract the logic device output signal corresponding in polarization to the original enable signal. This signal may be rotated to an orthogonal polarization by a standard polarization rotator (not shown) and fanned out by polarization beam splitters (not shown) for use as data signals in subsequent stages of logic devices. Polarizer 9 also serves to discard the data signals supplied on the orthogonal polarization to the enable signal.

For fundamental soliton pulses, it is possible to achieve a maximum small signal gain of approximately 9 given that the fundamental soliton amplitude may take values between 0.5 and 1.5.

The devices shown if the FIGS. are substantially immune to intensity or level fluctuations and timing errors because soliton dragging occurs when the signal pulses are sufficiently overlapped.

The combinatorial logic device shown in FIG. 2 performs a NOR logic function for data signals A and B in a manner similar to that for the device in FIG. 1. However, the device in FIG. 2 exhibits less sensitivity to phase differences between data signals A and B. In this device, enable signal on input fiber 20 and data signal A on input fiber 21 are merged onto birefringent fiber 23 via coupler 22. When data signal A, which is orthogonal to and overlapping in time with the enable signal, is present simultaneously with the enable signal, soliton dragging occurs and the enable signal is moved out of its original time slot. When the data signal A is not present, data signal B is capable of being merged onto fiber 26 with the enable signal. In a similar vein, when data signal B, which is orthogonal to and overlapping in time with the enable signal, is present simultaneously with the enable signal, soliton dragging occurs and the enable signal is moved out of its original time slot. Polarizer 27 discriminates against polarizations corresponding to the data signals and supplies only the polarizations corresponding to the polarization of the enable signal to output 28.

FIG. 3 shows a more detailed embodiment of the combinatorial logic device shown in FIG. 1. The enable signal is generated by laser 30 using an appropriate wavelength laser having sufficient power and sufficiently short pulse widths to permit formation of solitons. In an example from experimental practice, a passively mode locked NaCl color center laser is utilized for laser 30. The color center laser provides 300 fs pulses near 1.685 $\mu$m. Optical isolator 31 is positioned to prevent feedback of signals toward laser 30. Half wave plate 32 aligns the enable signal in the proper polarization. Delay element 33 adjusts the enable signal properly within its prescribed time slot. Mirror 34 is employed to redirect the enable signal toward the through-axis of polarization beam splitter 35.

Data signals A and B are merged by the combination of mirror 38 and polarization beam splitter 39. Delay elements 36 and 37 provide the necessary time shift to data signals A and B, respectively, so that the data signals exhibit a proper degree of overlap with respect to themselves and with respect to the enable signal.

The combined data signals output from polarization beam splitter 30 are combined with the enable signal in polarization beam splitter 35. When output from polarization beam splitter 35, the data signals are shown to be polarized orthogonally with respect to the enable signal for achieving soliton dragging in birefringent fiber 42. Half wave plate 40 aligns the polarizations of the data signals and the enable signal with the appropriate fiber axes. Lens 41 is utilized for coupling the optical signals onto birefringent fiber 42.

In this example, birefringent fiber 42 has a length corresponding to 25 $Z_0$ ($\approx$ 75 m), where $Z_0$ is the soliton period. The fiber has a polarization dispersion of 80 psec/km while exhibiting a polarization extinction ratio of 20 to 1.

Signals from birefringent fiber 42 are coupled into the remaining elements of a logic device by lens 43. Half wave plate 44 is used to align the polarizations output from the fiber with the polarizations expected by polarizer 45. Polarizer 45 operates in a manner similar to polarizers 9 and 27. As such, it passes the polarization corresponding to the enable signal and discards the polarization corresponding to the data signals. Beam splitter array 46 takes the output of polarizer 45 and provides a plurality of logic device output signals 47-1 through 47-n for use in subsequent stages of logic devices. Output signals 47-1 through 47-n are substantially equivalent replicas of the signal output from polarizer 45.

While it has not been shown in FIG. 3, it is understood by those skilled in the art that polarization rotation and, if necessary, signal attenuation elements may be placed at the device output or at the output of polarizer 45 to prepare the device output signals for distribution to subsequent logic device stages.

In an example from experimental practice, the arrangement in FIG. 3 is used with enable pulses of energy approximately 132 p J (i.e., a fundamental soliton amplitude N~1.5) and with signal pulses having energy of ~30 p J (i.e., a fundamental soliton amplitude N~0.707). For these exemplary signal energies, the device exhibited a small signal gain of 4.5.

NOR logic operation is shown in FIG. 4 for the device from FIG. 3. The traces shown in FIG. 4 show the amount of time shift for the enable pulse given the particular logical values ("0" or "1") for the data signals. Curve 51 shows that the enable signal has remained squarely in its original time slot when both data signals are at a logical "0" level. Curves 52 and 53 show that the enable signal has been moved at least one time slot away from its original time slot when either data signal is at a logical "1" level. Curve 54 shows that the enable signal has been moved several time slots away from its original time slot when both data signals are at a logical "1" level.

It is understood by those skilled in the art that the NOR device realization shown in FIGS. 1 through 3 is sufficient for realizing all logic functions necessary for optical computing and other optical logic applications. For example, by supplying a logical "0" input for data signal B, it is possible to realize an inverter (NOT logic device). By cascading an inverters at the inputs with NOR logic device, it is possible to realize the AND logic operation.

I claim:

1. An optical combinatorial logic device comprising means for generating an enable signal in a prescribed time slot, said time slot substantially corresponding to a pulse width of said enable signal, means responsive to at least a first data signal for combining said enable signal with said at least first data signal in a prescribed relationship, and means coupled to said signal combining means for substantially removing said enable signal from said prescribed time slot at an output of said device when said at least first data signal is present.

2. The optical combinatorial logic device defined in claim 1 further comprising means coupled to an output of said signal removing means for inhibiting further propagation of said at least first data signal.

3. The optical combinatorial logic device defined in claim 2 further comprising means coupled to said inhibiting means for replicating an output signal from said prescribed time slot.

4. An optical combinatorial logic device comprising means for generating an enable signal in a prescribed time slot, said time slot substantially corresponding to a pulse width of said enable signal, means responsive to at least a first data signal for combining said enable signal with said at least first data signal in a prescribed relationship, and means coupled to said signal combining means for moving said enable signal to a time slot neighboring said prescribed time slot at an output of said device when said at least first data signal is present.

5. The optical combinatorial logic device defined in claim 4 further comprising means coupled to an output of said signal moving means for inhibiting further propagation of said at least first data signal.

6. The optical combinatorial logic device defined in claim 5 further comprising means coupled to said inhibiting means for replicating an output signal from said prescribed time slot.

7. An optical combinatorial logic device comprising means for generating an enable signal in a prescribed time slot, said time slot substantially corresponding to a pulse width of said enable signal, means responsive to first and second data signals for combining said enable signal with said first and second data signals in a prescribed relationship, and means coupled to said signal combining means for substantially removing said enable signal from said prescribed time slot at an output of said device when said first data signal is present or when said second data signal is present.

8. The combinatorial logic device defined in claim 7 further comprising means coupled to an output of said signal removing means for inhibiting further propagation of said first and second data signals.

9. The optical combinatorial logic device defined in claim 7 wherein said first and second data signals and said enable signal are optical signals capable of soliton propagation in said removing means, said first and second data signals having substantially equal amplitudes at a level less than an amplitude of said enable signal, and said enable signal being polarized orthogonal to both said first and said second data signals.

10. The optical combinatorial logic device defined in claim 9 wherein said removing means includes a prescribed length of birefringent optical fiber.

11. The optical combinatorial logic device defined in claim 10 wherein said enable signal propagates along a fast axis of said birefringent optical fiber and wherein said first and second data signals propagate along a slow axis of said birefringent optical fiber, said first and second data signals being positioned to substantially overlap said enable signal in said prescribed time slot.

* * * * *